United States Patent [19]
Colletti et al.

[11] 4,211,152
[45] Jul. 8, 1980

[54] POWER STEERING MOTOR SEAL

[75] Inventors: John B. Colletti, Grosse Pointe Park; Forrest W. Howell, Rochester, both of Mich.

[73] Assignee: TRW Inc., Cleveland, Ohio

[21] Appl. No.: 897,038

[22] Filed: Apr. 17, 1978

[51] Int. Cl.² ............................................. F16J 15/18
[52] U.S. Cl. ..................................... 92/168; 74/498; 277/153; 277/166; 277/180
[58] Field of Search .................... 92/168, 136; 74/498, 74/388 PS; 180/148; 277/152, 153, 166, 180, 186

[56] References Cited
U.S. PATENT DOCUMENTS

| | | | |
|---|---|---|---|
| 2,899,938 | 8/1959 | Gardner | 92/168 |
| 3,166,908 | 1/1965 | Chouings | 92/168 |
| 3,347,109 | 10/1967 | Adams et al. | 74/498 |
| 3,511,513 | 5/1970 | Dahlheimer | 277/153 |
| 3,944,015 | 3/1976 | Bishop | 74/498 |

FOREIGN PATENT DOCUMENTS 1274434  9/1961  France ..................................... 74/498

Primary Examiner—Paul E. Maslousky

[57] ABSTRACT

An improved power steering motor seal performs three functions. The seal engages a tubular motor cylinder wall to prevent leakage of fluid between the wall and a housing. The seal also engages a rack bar to prevent fluid leakage between the rack bar and the housing. In addition, the seal blocks exposure of the housing, which is fluid pervious, to the fluid pressure in a motor chamber. The seal includes an annular body section which is disposed in a cavity in one end of the housing and engages the rack bar. The seal has a flange section which extends across the outer end of the housing into sealing engagement with the motor cylinder wall. A metal reinforcing member is provided to hold elastomeric sealing material in the flange section in sealing engagement with the inner surface of the motor cylinder wall.

16 Claims, 4 Drawing Figures 4,211,152

POWER STEERING MOTOR SEAL

BACKGROUND OF THE INVENTION

This invention relates to an improved power steering motor seal and more specifically to a power steering motor seal which blocks exposure of a fluid pervious motor housing to high pressure fluid in a motor cylinder chamber.

A known power steering motor includes an aluminum housing which is telescopically received in a tubular motor cylinder wall. The housing cooperates with the motor cylinder wall to partially define a motor cylinder chamber. To prevent leakage of high pressure fluid from the motor cylinder chamber, an annular seal is provided between one end of the housing and a rack bar which extends through the motor cylinder chamber. An O-ring seal is provided between the housing and the motor cylinder wall.

SUMMARY OF THE PRESENT INVENTION

The present invention provides a new and improved seal which is utilized in a power steering motor. The seal has a body portion which is disposed in a seal cavity at the end of a housing and engages both the housing and a rack bar to prevent fluid leakage between the housing and the rack bar. The seal is also provided with a radially outwardly extending flange section which sealingly engages an inner surface of a tubular motor cylinder wall to prevent fluid leakage between the motor cylinder wall and the housing.

The seal includes a body of elastomeric material which is supported by an annular reinforcing member. This annular reinforcing member has a main section which is disposed in the body section of the seal and is effective to hold the seal in place in a seal cavity formed in the housing. The reinforcing member extends radially outwardly into the flange section of the seal to hold the seal in engagement with the inside of the motor cylinder wall. The reinforcing member prevents excessive distortion of the seal under the influence of the relatively high fluid pressures in the motor chamber.

Accordingly, it is an object of this invention to provide a new and improved power steering motor having a seal which is effective to prevent fluid leakage between a rack bar and a housing and is effective to prevent fluid leakage between a tubular motor cylinder wall and the housing.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Figure 1:
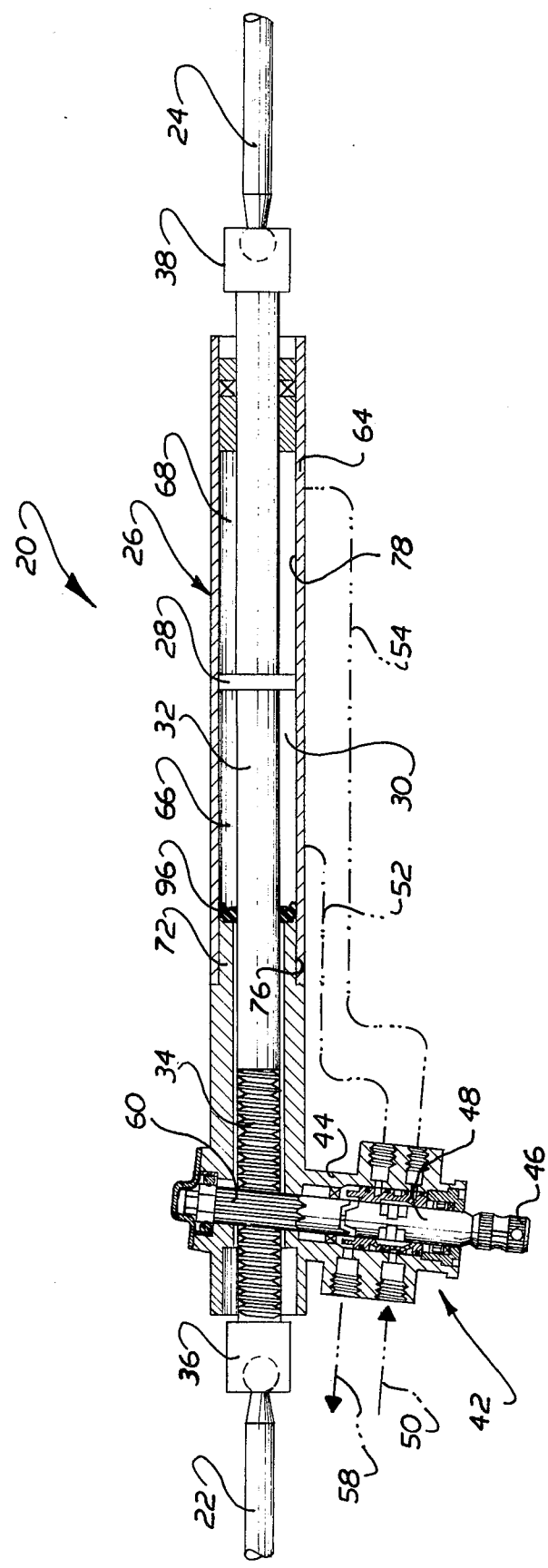
FIG. 1 is a fragmentary sectional view of a power steering assembly having a seal constructed in accordance with the present invention.

A power steering apparatus 20 (see FIG. 1) is connected with a pair of steerable vehicle wheels in a known manner by tie rods 22 and 24. The power steering apparatus 20 includes a power steering motor 26 having a circular piston 28 disposed in a cylindrical motor cylinder chamber 30. The piston 28 is fixedly connected with a generally cylindrical rack bar 32 upon which a longitudinally extending array of rack gear teeth 34 is disposed. Opposite ends of the rack bar 32 are connected with tie rods 22 and 24 by ball joints 36 and 38.

A valve assembly 42 is provided in a cast aluminum housing 44 to control operation of the power steering motor 26. The valve assembly 42 includes an input section 46 which is connected with a rotatable vehicle steering wheel (not shown) and is integrally formed with an inner valve member 48. Upon rotation of the input section 46, the valve assembly 42 directs fluid pressure from a conduit 50 to either a conduit 52 or 54 connected with the power steering motor 26. The other one of the two fluid conduits 52 or 54 is exhausted to a drain return conduit 58 through the valve assembly 42. The relatively high fluid pressure conducted to the power steering motor 26 results in movement of the piston 28 and rack bar 32 to effect turning movement of the vehicle wheels and rotation of a pinion gear 60.

The pinion gear 60 cooperates with the valve assembly 42 to return it to an unactuated condition when the steerable vehicle wheels have been turned to an extent corresponding to the extent of rotation of the input section 46. It should be noted that although the rack bar 32 is primarily moved under the influence of forces supplied by the power steering motor 26, drive forces can also be transmitted directly to the rack gear by the pinion gear 60 in a known manner. Since the general construction and mode of operation of the steering apparatus 20 is well known, it will not be further described herein to avoid prolixity of description.

The piston 28 cooperates with a cylindrical tubular motor cylinder wall 64 to form a pair of variable volume motor chambers 66 and 68. The left (as viewed in FIG. 1) end of the motor cylinder chamber 66 is formed by a cylindrical end section 72 of the housing 44. The end section 72 of the housing 44 is telescopically received in the tubular motor cylinder wall 64. The tubular motor cylinder wall 64 is formed of steel, and the housing 44 is formed of aluminum. The aluminum housing 44 has a cylindrical outer surface 76 which is disposed in telescopic engagement with a cylindrical inner surface 78 of the tubular cylinder wall 64.

Figure 2:
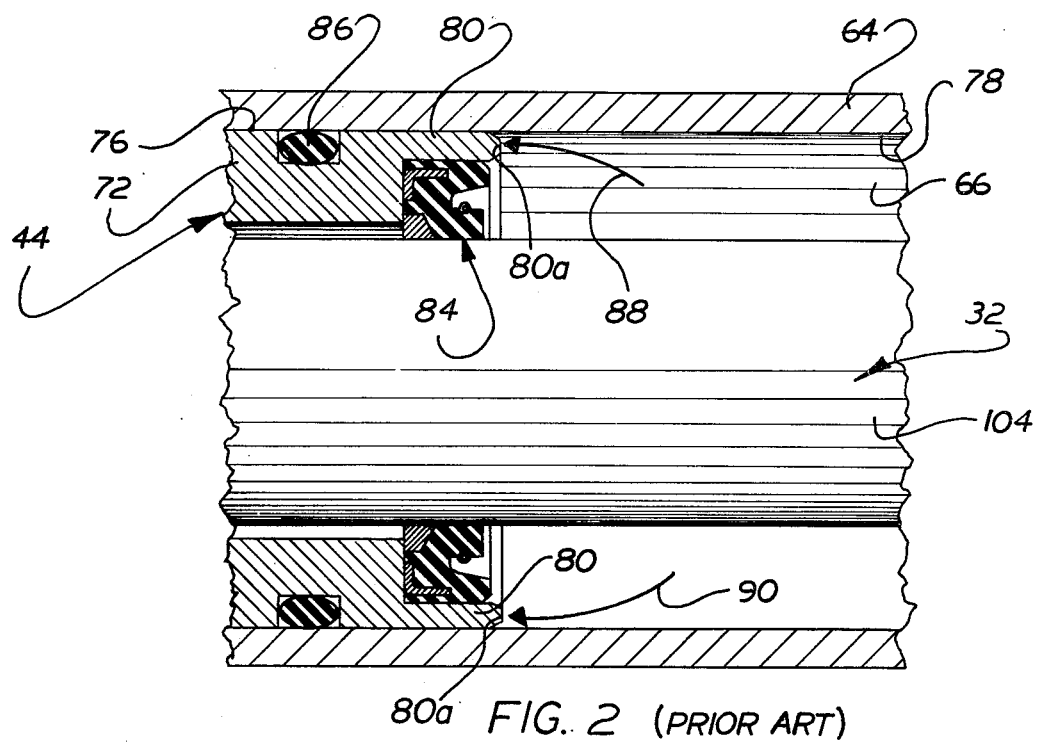
FIG. 2 is an enlarged fragmentary sectional view schematically illustrating a prior art seal.

With a known seal arrangement (FIG. 2), an annular rim section 80 extending axially outwardly from the cylindrical end portion 72 of the motor housing 44 is exposed to the relatively high fluid pressure in the motor chamber 66. A main seal 84 and a secondary or O-ring seal 86 are provided in the manner in FIG. 2. The end 80a of the rim section 80 is exposed to fluid pressure in the chamber 66 as indicated by arrows 88, 90.

In accordance with a feature of the present invention, a new and improved seal 96 (FIG. 3) is provided. The seal 96 has an annular body section 100 with a circular inner surface 102. The surface 102 sealingly engages a cylindrical outer surface 104 of the rack bar 32 to prevent the leakage of high pressure fluid to a housing passage 106 through which the rack bar extends.

The seal 96 has an annular flange section 110. The flange section 110 extends radially outwardly from the body section 100. The flange section 110 is provided with a circular outer surface area 112 which sealingly engages the cylindrical inner surface 78 of the tubular motor cylinder wall 64.

Accordingly, the seal 96 prevents the leakage of fluid from the motor cylinder chamber along two flow paths, that is along a flow path extending between the outer surface of the rack bar 32 and the housing 44 and along a flow path extending between the tubular motor cylinder wall 64 and the housing 44. In addition to preventing leakage along these two flow paths, the seal 96 is effective to prevent exposure of the aluminum housing 44 to the high pressure fluid in the motor chamber 66.

The seal 96 is disposed in an annular cavity 116 formed in an axially outer end portion of the housing 44. The seal cavity 116 is formed between the axially projecting rim section 80 and a radially extending annular end surface 118 of the housing 44. The rim 80 has an annular axially extending inner side surface 122 which is disposed in tight engagement with the body section 100 of the seal 96 to hold the seal against axial movement upon reciprocation of the rack bar 32.

A cylindrical outer side surface 126 of the rim section 80 extends parallel to the inner side surface 122 and is disposed in tight abutting engagement with the cylindrical inner surface 78 of the motor cylinder wall 64. A flat radially extending annular outer end surface area 128 on the rim section 80 is disposed in abutting engagement with the flange section 110 of the seal 96. It should be noted that relatively high fluid pressure in the chamber 66 is effective to press the seal 96 firmly into the annular seal cavity 116.

Figure 3:
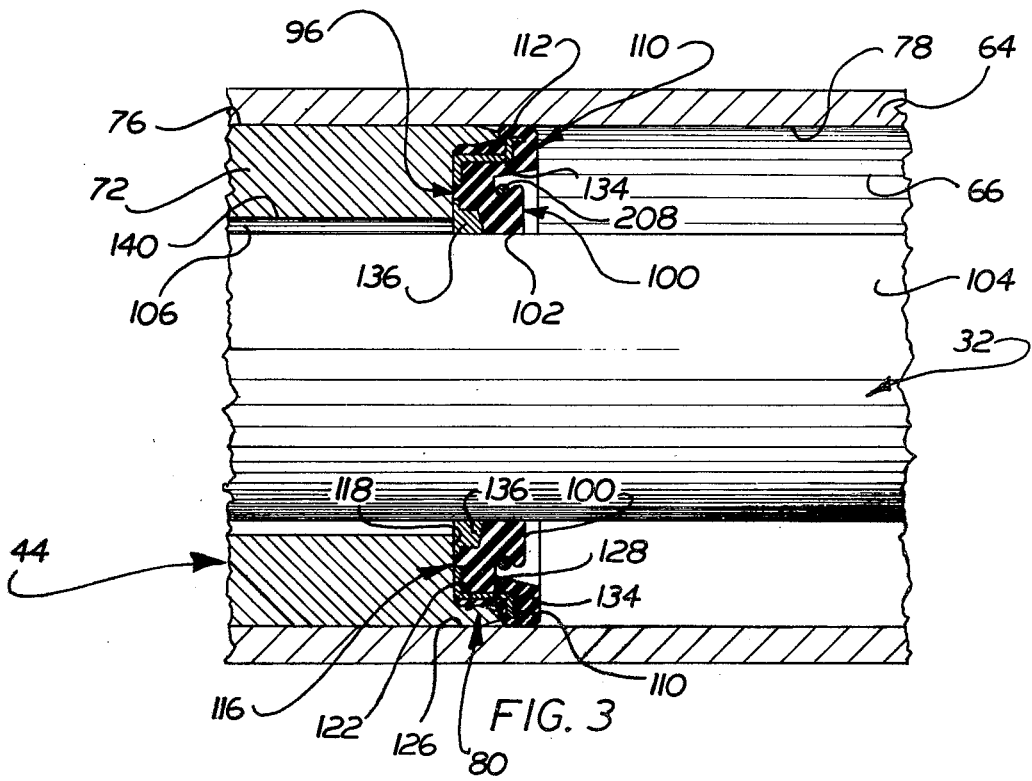
FIG. 3 is an enlarged fragmentary sectional view, generally similar to FIG. 2, illustrating the manner in which a seal constructed in accordance with the present invention is effective to provide a fluid tight seal between a rack bar and the housing and between the housing and a tubular motor cylinder wall.

The seal 96 includes a body of rubber or similar elastomeric material which sealingly engages both the axially movable rack bar 32 and the stationary motor cylinder wall 64. The body of elastomeric material is supported by an annular metal reinforcing member 134 and an annular bearing member 136. The annular reinforcing member 134 supports the flange section 110 with the surface area 112 in sealing engagement with the motor cylinder wall 64 (FIG. 3). In addition, the reinforcing member 134 prevents the elastomeric material of the seal 96 from being excessively deformed or extruded under the influence of a relatively high fluid pressure in the motor cylinder chamber 66.

The annular bearing section 136 supports the elastomeric material of body section 100 in sealing engagement with the outer side surface 104 of the rack bar 32. The bearing section 136 is also effective to prevent the elastomeric material of the body section 100 from being extruded into the space provided in the passage 106 between the cylindrical outer surface of the rack bar 32 and a cylindrical inner surface 140 of the housing.

The reinforcing member 134 includes a radially extending annular base section 144 (FIG. 4) having a flat side surface 146 which abuttingly engages the end surface 118 (see FIG. 3) of the seal cavity 116. The base section 144 is effective to transmit forces directly from the seal 96 to the housing 44. In addition, the base section 144 tends to stabilize the reinforcing member 134 in the seal cavity 116.

Figure 4:
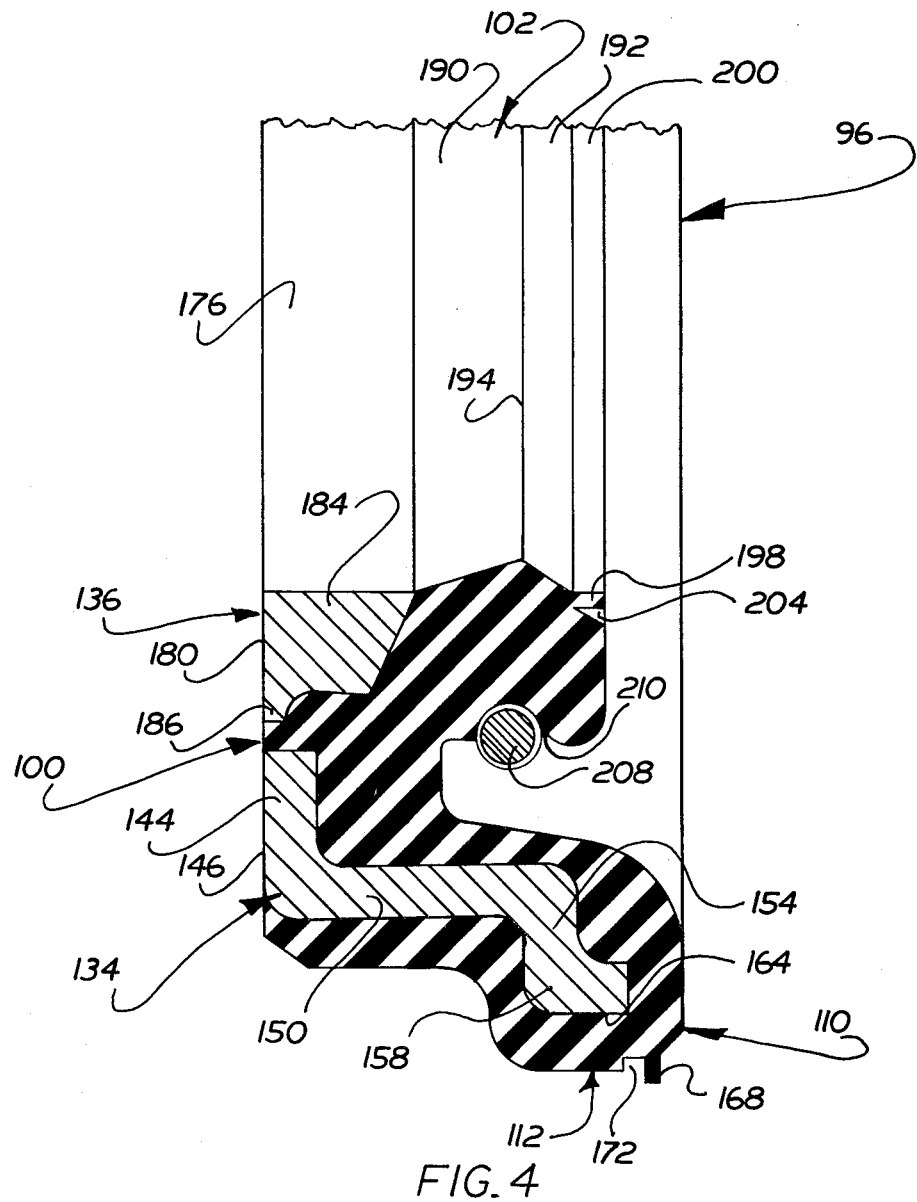
FIG. 4 is an enlarged fragmentary sectional view of a portion of the seal, the seal being shown in a relaxed condition prior to installation in a power steering motor.

To provide for a tight holding action between the body 100 of the seal 96 and the annular rim section 80, the reinforcing member 134 is provided with an annular axially extending main section 150 (FIG. 4). The main section 150 extends from the body section 100 of the seal 96 into the flange section 110. The main section 150 is effective to press the elastomeric material of the seal 96 firmly against the annular inner surface 122 (see FIG. 3) of the housing rim section 80. This holds the seal 96 against movement out of the cavity 116 under the influence of rightwardly (as viewed in FIG. 3) directed sliding forces between the seal and the rack bar 32 when the rack bar is moved axially toward the right (as viewed in FIGS. 1 and 3).

An annular retaining section 154 (FIG. 4) extends radially outwardly from the axially outermost end portion of the main section 150 of the reinforcing member 134. The retaining section 154 is effective to transfer axially directed pressure forces applied against flange section 110 of the seal 96 to the annular end surface area 128 of the rim section 80 (see FIG. 3) through elastomeric material disposed on the axially inner side of the retaining section 154 (FIG. 4). The retaining section 154 of the reinforcing member 134 extends radially outwardly across the axially outer end portion of the rim section 80 to support the flange section 110 of the seal 96.

An annular support section 158 extends axially outwardly from a radially outer end portion of the retaining section 154 in a direction parallel to the motor cylinder wall 64. The section 158 is effective to support the annular axially extending outer surface area 112 of the flange section 110 in sealing engagement with the cylindrical inner surfaced 78 of the motor cylinder wall 64. The support section 158 extends parallel to the main section 150 of the reinforcing member 134. The support section 158 is effective to press the elastomeric material which is radially outwardly of a cylindrical outer side surface 164 of the support section firmly against the inner surface 78 of the tubular motor cylinder wall 64.

In order to insure the formation of a firm fluid tight seal between the lip portion 110 of seal 96 and the inner side surface of the tubular motor cylinder wall 64, an annular seal lip 168 is provided on the flange 110 of the seal 96. The lip 168 extends radially outwardly of the cylindrical seal surface 112 and engages the cylindrical inner side surface 78 of the motor cylinder wall 64. When the seal 96 is installed in the power steering apparatus in the manner shown in FIG. 3, the seal lip 168 will be compressed radially inwardly and may, to some extent, be deflected axially sideways. Any fluid which seeps past the seal lip 168 cooperates with an annular groove 172 to form a pressure dam, that is an area of fluid pressure which is less than the pressure in the motor chamber 68 and greater than the pressure outside of the motor chamber. This reduces the pressure differential across the seal surface area 112 of the flange 110.

The bearing member 136 has an annular inner surface 176 which engages the cylindrical outer surface 104 of the rack bar 32 to prevent the elastomeric material in the body portion of the seal 96 from being extruded between the inner surface 140 of the housing and the cylindrical outer surface of the rack bar. The bearing member 136 is provided with a flat annular surface 180 which abuttingly engages the flat annular end surface 118 of the bearing cavity 116 at a location radially inwardly from the area where the reinforcing member 134 engages the surface 118. This enables axial forces applied to the seal 96 to be transmitted directly by the bearing member 136 to the housing 44. It should be noted that the bearing member 136 has a main section 184 which backs up the circular seal surface 102 and a radially projecting support section 186 which extends toward the reinforcing member 134 to tend to maximize the area of contact between the bearing member 136 and the annular housing surface 118.

The circular surface area 102 which engages the cylindrical outer surface 104 of the rack bar 32 includes a pair of axially sloping annular inner side surfaces 190 and 192. The surfaces 190 and 192 intersect at a circular peak 194 located radially inwardly of the annular bearing surface 176 when the seal 96 is in the relaxed condition of FIG. 4.

When the seal is installed in the power steering apparatus 20, the elastomeric material of the body section 100 is compressed so that the surfaces 190 and 192 are disposed in tight abutting engagement with the cylindrical outer surface 104 of the rack bar 32 in the manner shown in FIG. 3. This results in the circular seal surface 102 being generally coplanar with the annular bearing surface 176. However, it is contemplated that there will be a very slight clearance between the bearing surface 176 and the outer surface 104 of the rack bar 32 to facilitate axial movement of the rack bar relative to the bearing member. Therefore the circular seal surface 102 will extend slightly radially inwardly of the annular bearing surface 176 to prevent the leakage of fluid along a path extending between the outer surface 104 of the rack bar 32 and the inner surface 176 of the bearing member 136.

The body portion 100 of the seal 96 is advantageously provided with an axially extending annular seal lip 198. The lip 198 has an annular axially extending inner side surface 200 which sealingly engages the cylindrical outer surface 104 of the rack bar 32. An annular space 204 with a generally triangular cross sectional configuration is provided radially outwardly of the seal lip 198.

In order to provide for firm sealing engagement between the seal surface 102 and a cylindrical outer side surface 104 of the rack bar 32, an annular garter spring 208 circumscribes a portion of the seal body 100 which is radially outwardly of the annular seal surface 102. The spring 208 is effective to press the seal surface 102 into tight sealing engagement with the rack bar 32. In order to retain the spring 208 against axial movement relative to the body section 100 of the seal 98, the body section is provided with an annular radially inwardly projecting groove 210 in which the spring 208 is mounted.

In view of the foregoing description it is apparent that the present invention provides a new and improved seal 96 which is utilized in a power steering motor 26 to perform three functions. Thus, the seal 96 has a body portion 100 which is disposed in a seal cavity 116 at the end of a housing 44 and engages both the housing and a rack bar 32 to prevent fluid leakage between the housing and the rack bar. The seal 96 is provided with a radially outwardly extending flange section 110 which sealingly engages an inner surface 78 of a tubular motor cylinder wall 64 to prevent fluid leakage between the motor cylinder wall and the housing. In addition, the seal blocks exposure of the fluid pervious housing to high pressure fluid in the motor chamber 66 to prevent seepage of fluid through the fluid pervious housing.

The seal 96 includes a body of elastomeric material which is supported by an annular reinforcing member 134. The annular reinforcing member 134 has a main section 150 which is disposed in the body section 110 of the seal 96 and is effective to hold the seal in place in the seal cavity 116. The reinforcing member 134 extends radially outwardly into the flange section of the seal to hold the seal in engagement with the inside of the motor cylinder wall 64. The reinforcing member prevents excessive distortion of the seal 96 under the influence of the relatively high fluid pressures in the motor chamber 66.

Having described one specific preferred embodiment of the invention, the following is claimed:

1. A power steering apparatus for use in turning a steerable vehicle wheel, said apparatus comprising a tubular motor cylinder wall partially defining a motor chamber which receives fluid under pressure, a housing, said housing having an end section which is telescopically received in said tubular motor cylinder wall to further define said motor chamber, said end section of said housing having a cylindrical inner surface which at least partially defines a passage extending through said housing, said end section of said housing including an axially extending annular rim section, said rim section having an outer side surface area disposed in engagement with an inner side surface of said tubular motor cylinder wall, said rim section of said housing including a generally radially inwardly facing inner side surface area, said end section of said housing further including an annular end surface, said annular end surface cooperating with said radially inwardly facing inner side surface area to at least partially define a seal cavity, said rim section of said housing further including a circular end surface area interconnecting said inner and outer side surface areas of said rim section, said apparatus further including an axially movable rack bar extending axially through said motor chamber and said passage in said housing, a piston fixedly connected with said rack bar and cooperating with said tubular motor cylinder wall to further define the motor chamber, and seal means for sealingly engaging said rack bar and said tubular motor cylinder wall for preventing exposure of said end section of said housing to the fluid pressure in said motor chamber, for preventing leakage of fluid between said rack bar and housing through said passage, and for preventing leakage of fluid between said tubular motor cylinder wall and said housing, said seal means including an annular body section at least partially disposed in said seal cavity and a flange section extending generally radially outwardly from said body section and across said end surface area of said rim section of said housing, said body section of said seal means including a circular inner surface area disposed in sealing engagement with said rack bar to prevent fluid leakage from said motor chamber through said passage in said housing, said flange section of said seal means including a circular outer surface area disposed in sealing engagement with the inner side surface of said tubular motor cylinder wall to prevent fluid leakage between said housing and said tubular motor cylinder wall, said seal means including elastomeric material which at least partially defines said body and flange sections of said seal means and a reinforcing member disposed in said elastomeric material, said reinforcing member having an annular main section extending between said body and flange sections of said seal means and a retaining section which extends radially outwardly from said main section and is disposed in said flange section of said seal means, said main section of said reinforcing member being at least partially disposed radially inwardly of said inner side surface area of said housing rim section, said retaining section of said reinforcing member extending across said end surface area of said housing rim section to at least partially support said flange section of said seal means, said reinforcing member further including an annular support section extending axially outwardly from said retaining section in a direction away from said main section and generally parallel to the inner side surface of said tubular motor cylinder wall to support said circular outer surface area of said flange section in sealing engagement with the inner side surface of said tubular motor cylinder wall.

2. An apparatus as set forth in claim 1 wherein said reinforcing member further includes a base section which extends radially inwardly from said main section and is disposed adjacent to said annular end surface of said housing end section.

3. An apparatus as set forth in claim 2 wherein said seal means further includes an annular bearing member having a main section with an annular bearing surface area which is disposed in engagement with said rack bar, said circular inner surface area of said seal means being disposed axially outwardly of said bearing surface area at a location between said bearing member and the motor chamber, said bearing member having an annular main support section which extends radially outwardly from said main section toward said base section of said reinforcing member.

4. An apparatus as set forth in claim 3 further including an axially extending inner seal lip disposed in sealing engagement with said rack bar on an axial side of said circular inner surface area of said seal means which is opposite from said bearing member to further promote sealing engagement of said seal means with said rack bar.

5. An apparatus as set forth in claim 4 further including an outer seal lip disposed in sealing engagement with the inner side surface of said tubular motor cylinder wall on an axial side of said circular outer surface which is toward said motor chamber to further promote sealing engagement of said seal means with said tubular motor cylinder wall.

6. A power steering apparatus for use in turning a steerable vehicle wheel, said apparatus comprising a tubular motor cylinder wall partially defining a motor chamber which receives fluid under pressure, a housing, said housing having an end section which is telescopically received in said tubular motor cylinder wall to further define said motor chamber, said end section of said housing having a cylindrical inner surface which at least partially defines a passage extending through said housing, said end section of said housing including an axially extending annular rim section, said rim section having an outer side surface area disposed in engagement with an inner side surface of said tubular motor cylinder wall, said rim section of said housing including a generally radially inwardly facing inner side surface area, said end section of said housing further including an annular end surface, said annular end surface cooperating with said radially inwardly facing inner side surface area to at least partially define a seal cavity, said rim section of said housing further including a circular end surface area interconnecting said inner and outer side surface areas of said rim section, said apparatus further including an axially movable rack bar extending axially through said motor chamber and said passage in said housing, a piston fixedly connected with said rack bar and cooperating with said tubular motor cylinder wall to further define the motor chamber, and seal means for sealingly engaging said rack bar and said tubular motor cylinder wall for preventing exposure of said end section of said housing to the fluid pressure in said motor chamber, for preventing leakage of fluid between said rack bar and housing through said passage, and for preventing leakage of fluid between said tubular motor cylinder wall and said housing, said seal means including an annular body section at least partially disposed in said seal cavity and a flange section extending generally radially outwardly from said body section and across said end surface area of said rim section of said housing, said body section of said seal means including a circular inner surface area disposed in sealing engagement with said rack bar to prevent fluid leakage from said motor chamber through said passage in said housing, said flange section of said seal means including a circular outer surface area disposed in sealing engagement with the inner side surface of said tubular motor cylinder wall to prevent fluid leakage between said housing and said tubular motor cylinder wall, said seal means including elastomeric material which at least partially defines said body and flange sections of said seal means and a reinforcing member disposed in said elastomeric material, said reinforcing member having an annular main section extending between said body and flange sections of said seal means and a retaining section which extends radially outwardly from said main section and is disposed in said flange section of said seal means, said main section of said reinforcing member being at least partially disposed in said seal cavity and having a diameter which is greater than the diameter of said cylindrical inner surface of said housing, said retaining section of said reinforcing member extending across said end surface area of said housing rim section to at least partially support said flange section of said seal means.

7. An apparatus as set forth in claim 6 wherein said reinforcing member further includes a base section which extends radially inwardly from said main section and is disposed in said seal cavity adjacent to said annular end surface of said housing end section.

8. An apparatus as set forth in claim 7 wherein said seal means further includes an annular bearing member having a main section with an annular bearing surface area which is disposed in engagement with said rack bar at a location radially inwardly from said main section of said reinforcing member, said circular inner surface area of said seal means being disposed axially outwardly of said bearing surface area at a location between said bearing member and the motor chamber.

9. An apparatus as set forth in claim 8 further including an axially extending inner seal lip disposed in sealing engagement with said rack bar on an axial side of said circular inner surface area of said seal means which is opposite from said bearing member to further promote sealing engagement of said seal means with said rack bar.

10. An apparatus as set forth in claim 9 further including an outer seal lip disposed in sealing engagement with the inner side surface of said tubular motor cylinder wall on an axial side of said circular outer surface which is toward said motor chamber to further promote sealing engagement of said seal means with said tubular motor cylinder wall.

11. A power steering apparatus for use in turning a steerable vehicle wheel, said apparatus comprising a tubular motor cylinder wall partially defining a motor chamber which receives fluid under pressure, a housing, said housing having an end section which is telescopically received in said tubular motor cylinder wall to further define said motor chamber, said end section of said housing having a cylindrical inner surface which at least partially defines a passage extending through said housing, said end section of said housing including an axially extending annular rim section, said rim section having an outer side surface area disposed in engagement with an inner side surface of said tubular motor cylinder wall, said rim section of said housing including a generally radially inwardly facing inner side surface area, said end section of said housing further including an annular end surface, said annular end surface cooperating with said radially inwardly facing inner side surface area to at least partially define a seal cavity, said rim section of said housing further including a circular end surface area interconnecting said inner and outer side surface areas of said rim section, said apparatus further including an axially movable rack bar extending axially through said motor chamber and said passage in said housing, a piston fixedly connected with said rack bar and cooperating with said tubular motor cylinder wall to further define the motor chamber, and seal means for sealingly engaging said rack bar and said tubular motor cylinder wall for preventing exposure of said end section of said housing to the fluid pressure in said motor chamber, for preventing leakage of fluid between said rack bar and housing through said passage, and for preventing leakage of fluid between said tubular motor cylinder wall and said housing, said seal means including an annular body section at least partially disposed in said seal cavity and a flange section extending generally radially outwardly from said body section and across said end surface area of said rim section of said housing, said body section of said seal means including a circular inner surface area disposed in sealing engagement with said rack bar to prevent fluid leakage from said motor chamber through said passage in said housing, said flange section of said seal means including a circular outer surface area disposed in sealing engagement with the inner side surface of said tubular motor cylinder wall to prevent fluid leakage between said housing and said tubular motor cylinder wall, said seal means including elastomeric material which at least partially defines said body and flange sections of said seal means and a reinforcing member disposed in said elastomeric material, said reinforcing member having an annular main section, a retaining section which extends radially outwardly from a first axial end of said main section and is at least partially disposed in said flange section of said seal means and a base section which extends radially inwardly from a second axial end of said main section, said main section of said reinforcing member being at least partially disposed in said seal cavity, said retaining section of said reinforcing member extending across said end surface area of said housing rim section to at least partially support said flange section of said seal means, said base section of said reinforcing member being disposed in said seal cavity adjacent to said end surface of said housing end section.

12. An apparatus as set forth in claim 11 wherein said reinforcing member further includes an annular support section extending axially outwardly from said retaining section in a direction away from said main section to support said circular outer surface area of said flange section in sealing engagement with the inner side surface of said tubular motor cylinder wall.

13. An apparatus as set forth in claim 11 wherein said seal means further includes an annular bearing member having a main section with an annular bearing surface area which is disposed in engagement with said rack bar, said bearing member having an annular main support section which extends radially outwardly from said main section toward said base section of said reinforcing member.

14. An apparatus as set forth in claim 13 wherein said base section of said reinforcing member and said annular bearing member are both disposed in abutting engagement with said end surface of said housing end section.

15. An apparatus as set forth in claim 14 further including an axially extending inner seal lip disposed in sealing engagement with said rack bar on an axial side of said circular inner surface area of said seal means which is opposite from said bearing member to further promote sealing engagement of said seal means with said rack bar.

16. An apparatus as set forth in claim 15 further including an outer seal lip disposed in sealing engagement with the inner side surface of said tubular motor cylinder wall on an axial side of said circular outer surface which is toward said motor chamber to further promote sealing engagement of said seal means with said tubular motor cylinder wall.

* * * * *